(12) United States Patent
Badesha et al.

(10) Patent No.: US 10,384,441 B2
(45) Date of Patent: Aug. 20, 2019

(54) FLUOROSILICONE COMPOSITE AND FORMULATION PROCESS FOR IMAGING PLATE

(71) Applicant: XEROX CORPORATION, Norwalk, CT (US)

(72) Inventors: Santokh S. Badesha, Pittsford, NY (US); Mandakini Kanungo, Penfield, NY (US); Kevin H. Taft, Williamson, NY (US); Yu Qi, Penfield, NY (US); Chenyu Lin, Potsdam, NY (US)

(73) Assignee: Xerox Corporation, Norwalk, CT (US)

( * ) Notice: Subject to any disclaimer, the term of this patent is extended or adjusted under 35 U.S.C. 154(b) by 390 days.

(21) Appl. No.: 15/222,364

(22) Filed: Jul. 28, 2016

(65) Prior Publication Data

US 2018/0029351 A1 Feb. 1, 2018

(51) Int. Cl.
*B41C 1/10* (2006.01)
*B41N 1/00* (2006.01)
(Continued)

(52) U.S. Cl.
CPC .......... *B41C 1/1066* (2013.01); *B41N 1/003* (2013.01); *C08K 9/06* (2013.01); *C09D 7/61* (2018.01); *C09D 183/08* (2013.01); *B41C 1/1041* (2013.01); *B41N 1/12* (2013.01); *B41N 3/08* (2013.01); *B41N 10/00* (2013.01); *B41N 2210/10* (2013.01); *B41N 2210/14* (2013.01); *C08G 77/12* (2013.01); *C08G 77/20* (2013.01); *C08G 77/24* (2013.01); *C08K 3/04* (2013.01); *C08K 3/36* (2013.01)

(58) Field of Classification Search
CPC .......... B41C 1/066; B41C 1/041; C09D 7/61; C09D 183/08; B41N 1/003; B41N 1/12; B41N 3/08; B41N 10/00; B41N 2210/14; B41N 2210/10; C08K 9/06; C08K 3/04; C08K 3/36; C08G 77/24; C08G 77/12; C08G 77/20

See application file for complete search history.

(56) References Cited

U.S. PATENT DOCUMENTS 4,064,027 A * 12/1977 Gant ................. C08K 5/07
522/172
4,360,566 A * 11/1982 Shimizu ............. C08L 83/04
118/60

(Continued)

FOREIGN PATENT DOCUMENTS

| EP | 2868482 | 5/2015 |
| EP | 3248804 | 11/2017 |

*Primary Examiner* — Kevin R Kruer
(74) *Attorney, Agent, or Firm* — Caesar Rivise, PC

(57) ABSTRACT

An apparatus and method of manufacturing a fluorosilicone composite for a variable data lithography imaging member surface layer. Examples of the fluorosilicone composite include a first part and a second part, the first part having fluorosilicone, carbon black, silica and butyl acetate, the second part having a platinum catalyst, a crosslinker, butyl acetate and an inhibitor. The first part may also include a dispersant (e.g., a polyoxyalkylene amine derivative) that removes a need for shaking the dispersion by paint shaker and instead allows a more manufacture friendly roll ball milling process. The dispersant will also help in stabilizing the fluorosilicone composite for scaled up production.

20 Claims, 5 Drawing Sheets

(51) Int. Cl.

| | | |
|---|---|---|
| *B41N 1/12* | (2006.01) | |
| *B41N 3/08* | (2006.01) | |
| *C08K 3/04* | (2006.01) | |
| *C08K 3/36* | (2006.01) | |
| *C08K 9/06* | (2006.01) | |
| *C09D 7/61* | (2018.01) | |
| *B41N 10/00* | (2006.01) | |
| *C08G 77/12* | (2006.01) | |
| *C08G 77/20* | (2006.01) | |
| *C08G 77/24* | (2006.01) | |
| *C08L 83/14* | (2006.01) | |
| *C09D 183/08* | (2006.01) | |

(56) References Cited

U.S. PATENT DOCUMENTS

| | | | | |
|---|---|---|---|---|
| 4,786,701 A * | 11/1988 | Tanaka | C08L 83/04 | 528/15 |
| 4,871,782 A * | 10/1989 | Modic | C08J 9/02 | 521/88 |
| 5,081,172 A * | 1/1992 | Chaffee | C08K 9/06 | 524/188 |
| 5,132,340 A * | 7/1992 | Evans | C08K 9/08 | 523/209 |
| 5,239,035 A * | 8/1993 | Maxson | C08L 83/00 | 528/15 |
| 5,244,938 A * | 9/1993 | Arai | C08K 5/5419 | 523/206 |
| 5,254,623 A * | 10/1993 | Watson | C08F 8/42 | 524/730 |
| 5,270,768 A * | 12/1993 | Murata | G03G 15/1685 | 399/176 |
| 5,288,829 A * | 2/1994 | Takago | C08L 83/12 | 528/15 |
| 5,428,097 A * | 6/1995 | Kobayashi | C04B 28/02 | 524/493 |
| 5,468,531 A * | 11/1995 | Kikukawa | G03G 15/2057 | 428/304.4 |
| 5,538,782 A * | 7/1996 | Tomono | B41N 10/02 | 428/304.4 |
| 5,616,632 A * | 4/1997 | Fujiki | C08K 9/10 | 523/211 |
| 6,270,214 B1 * | 8/2001 | Smith | B41M 5/529 | 347/100 |
| 6,297,302 B1 * | 10/2001 | Heeks | C08K 5/098 | 399/308 |
| 6,336,026 B1 * | 1/2002 | Heeks | C08L 83/04 | 399/302 |
| 6,369,155 B1 * | 4/2002 | Takita | C08L 83/08 | 277/910 |
| 7,090,922 B2 * | 8/2006 | Zhou | C08G 18/3228 | 428/447 |
| 8,784,787 B2 * | 7/2014 | Tamura | A61K 8/894 | 424/70.19 |
| 9,267,646 B2 | 2/2016 | Knausdorf et al. | | |
| 9,283,795 B1 * | 3/2016 | Kanungo | B41N 10/00 | |
| 9,327,487 B2 | 5/2016 | Liu | | |
| 2003/0228179 A1 * | 12/2003 | Yaomin | G03G 15/2057 | 399/329 |
| 2004/0002012 A1 * | 1/2004 | Pavlisko | G03G 9/08782 | 430/45.5 |
| 2005/0025540 A1 * | 2/2005 | Murai | G03G 15/2064 | 399/341 |
| 2007/0117920 A1 * | 5/2007 | Hirabayashi | C08L 83/04 | 524/588 |
| 2007/0135555 A1 * | 6/2007 | Hirabayashi | C08L 83/04 | 524/492 |
| 2007/0264502 A1 * | 11/2007 | Floess | G03G 9/0802 | 428/403 |
| 2007/0296122 A1 * | 12/2007 | Chen | B29C 71/02 | 264/346 |
| 2009/0191414 A1 * | 7/2009 | Sekiba | C09J 183/04 | 428/447 |
| 2009/0326122 A1 * | 12/2009 | Sato | C08L 83/08 | 524/379 |
| 2012/0103212 A1 | 5/2012 | Stowe et al. | | |
| 2013/0028634 A1 * | 1/2013 | Koyanagi | G03G 15/0818 | 399/111 |
| 2013/0287454 A1 * | 10/2013 | Anan | G03G 15/0818 | 399/286 |
| 2014/0060358 A1 * | 3/2014 | Hsieh | B41M 1/06 | 101/450.1 |
| 2014/0060362 A1 * | 3/2014 | Kanungo | B41F 7/00 | 101/450.1 |
| 2014/0064797 A1 * | 3/2014 | Yamada | C08G 18/4825 | 399/286 |
| 2014/0079442 A1 * | 3/2014 | Yamada | G03G 15/0818 | 399/286 |
| 2014/0187649 A1 * | 7/2014 | Tamura | A61Q 19/00 | 514/772 |
| 2014/0255610 A1 * | 9/2014 | Sambhy | C09D 183/08 | 427/387 |
| 2015/0085043 A1 * | 3/2015 | Keoshkerian | B41J 2/0057 | 347/103 |
| 2015/0123044 A1 * | 5/2015 | Yoshida | C08L 83/08 | 252/511 |
| 2016/0017168 A1 * | 1/2016 | Korchev | C09D 5/00 | 427/553 |
| 2016/0024314 A1 * | 1/2016 | Olsen | C09D 5/1693 | 428/447 |
| 2016/0122611 A1 * | 5/2016 | Yoshida | C08L 83/04 | 252/75 |
| 2017/0174910 A1 * | 6/2017 | Nowak | C08G 18/4833 | |
| 2017/0341452 A1 * | 11/2017 | Kanungo | B41F 3/30 | |

* cited by examiner

FLUOROSILICONE COMPOSITE AND FORMULATION PROCESS FOR IMAGING PLATE

FIELD OF DISCLOSURE

The disclosure relates to marking and printing systems, and more specifically to imaging members suitable for use in various marking and printing methods and systems, such as offset printing. Methods of making and using such imaging members are also disclosed.

BACKGROUND OF THE INVENTION

Offset lithography is a common method of printing today. (For the purposes hereof, the terms "printing" and "marking" are interchangeable.) In a typical lithographic process, an image transfer element or imaging plate, which may be a flat plate-like structure, the surface of a cylinder, or belt, etc., is configured to have "image regions" formed of hydrophobic and oleophilic material, and "non-image regions" formed of a hydrophilic material. The image regions are regions corresponding to the areas on the final print (i.e., the target substrate) that are occupied by a printing or marking material such as ink, whereas the non-image regions are the regions corresponding to the areas on the final print that are not occupied by said marking material. The hydrophilic regions accept and are readily wetted by a water-based fluid, commonly referred to as a fountain solution or dampening fluid (typically consisting of water and a small amount of alcohol as well as other additives and/or surfactants to, for example, reduce surface tension). The hydrophobic regions repel fountain solution and accept ink, whereas the fountain solution formed over the hydrophilic regions forms a fluid "release layer" for rejecting ink. Therefore, the hydrophilic regions of the imaging plate correspond to unprinted areas, or "non-image areas", of the final print.

The ink may be transferred directly to a substrate, such as paper, or may be applied to an intermediate surface, such as an offset (or blanket) cylinder in an offset printing system. In the latter case, the offset cylinder is covered with a conformable coating or sleeve with a surface that can conform to the texture of the substrate, which may have surface peak-to-valley depth somewhat greater than the surface peak-to-valley depth of the imaging blanket. Sufficient pressure is used to transfer the image from the blanket or offset cylinder to the substrate.

The above-described lithographic and offset printing techniques utilize plates which are permanently patterned with the image to be printed (or its negative), and are therefore useful only when printing a large number of copies of the same image (long print runs), such as magazines, newspapers, and the like. These methods do not permit printing a different pattern from one page to the next (referred to herein as variable printing) without removing and replacing the print cylinder and/or the imaging plate (i.e., the technique cannot accommodate true high speed variable printing wherein the image changes from impression to impression, for example, as in the case of digital printing systems).

Efforts have been made to create lithographic and offset printing systems for variable data. One example is disclosed in U.S. Patent Application Publication No. 2012/0103212 A1 (the '212 Publication) published May 3, 2012, and based on U.S. patent application Ser. No. 13/095,714, which is commonly assigned, and the disclosure of which is hereby incorporated by reference herein in its entirety, in which an intense energy source such as a laser is used to pattern-wise evaporate a fountain solution. The '212 publication discloses a family of variable data lithography devices that use a structure to perform both the functions of a traditional imaging plate and of a traditional blanket to retain a patterned fountain solution of dampening fluid for inking, and to delivering that ink pattern to a substrate. A blanket performing both of these functions is referred to herein as an imaging blanket. The imaging blanket retains a fountain solution, requiring that its surface have a selected texture.

Fluoroelastomers and fluoropolymers have been used in a variety of printing systems over the years. For example, fluoroelastomers have been used to form the reimageable surface layer in variable data lithography systems. Such reimageable surface layers have included Trifluorotoluene (TFT) as a solvent. However, the inventors found that TFT is not an environmentally friendly solvent and therefore is not manufacture friendly. Further, known crosslinkers such as XL-150 (available from Nusil) are expensive and, thus, undesirable. Also, the current formulations require vigorous shaking with a paint shaker for long hours (e.g., 6-8 hours) to disperse the carbon black in the formulation. Thus, a benefit could be provided by the development of a reimageable surface layer formulation with an environmentally friendly solvent and a crosslinking system that enables a scale-up process for manufacture. It would also be beneficial to provide a more manufacture friendly way of preparing the formulation.

BRIEF SUMMARY OF THE INVENTION

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing an apparatus and method of manufacturing a fluorosilicone composite for a variable data lithography imaging member surface layer. Examples of the fluorosilicone composite include a first part and a second part, the first part having fluorosilicone, carbon black, silica and butyl acetate, the second part having a platinum catalyst, a crosslinker, butyl acetate and an inhibitor. The first part may also include a dispersant (e.g., a polyoxyalkylene amine derivative) that removes a need for shaking the dispersion by paint shaker and instead allows a more manufacture friendly roll ball milling process. The dispersant will also help in stabilizing the fluorosilicone composite for scaled up production.

The exemplary embodiments may include a method of manufacturing a fluorosilicone composite surface layer for a variable data lithography imaging blanket. By example, the method includes adding a silica, a carbon black, a dispersant, a first portion of butyl acetate and beads together in a container, mixing the heated silica, the carbon black, the dispersant, the first portion of butyl acetate and the beads resulting in a first mixture, adding fluorosilicone into the first mixture, mixing the fluorosilicone and the first mixture resulting in a first part of the fluorosilicone composite, adding platinum catalyst to the first part of the fluorosilicone composite, mixing the platinum catalyst and the first part of the fluorosilicone composite resulting in a second mixture, adding a crosslinker solution to the second mixture and mixing the combination resulting in a third mixture, diluting the third mixture by combining and mixing a second portion of butyl acetate with the third mixture, and removing the beads from the third mixture resulting in the fluorosilicone composite.

According to aspects illustrated herein, a fluorosilicone composite for a variable data lithography imaging member includes a first part and a second part. The first part has fluorosilicone, carbon black, silica and butyl acetate. The first part may also include a dispersant. The second part has a platinum catalyst, a crosslinker, butyl acetate and an inhibitor. The fluorosilicone composite may be made by exemplary methods discussed in greater detail below, including a paint shaking method and a manufacturing friendly ball mill rolling method.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION OF THE INVENTION

Figure 1:
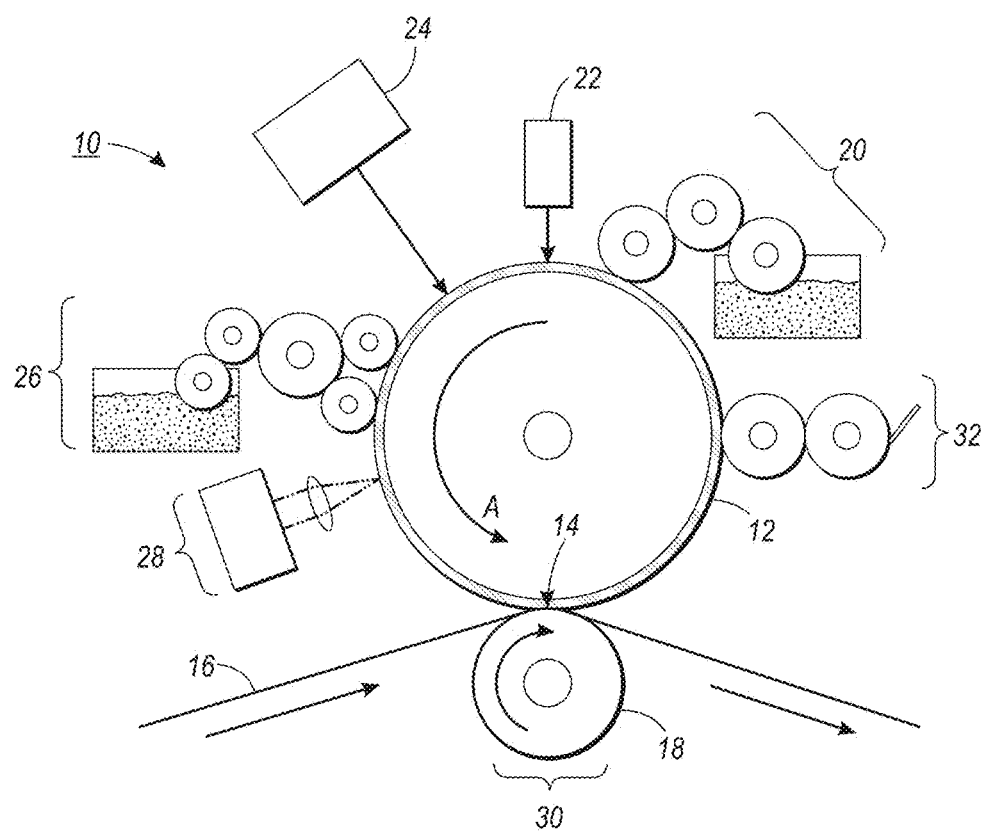
FIG. 1 is a side view of a related art variable data lithography system.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of resistors" may include two or more resistors.

The term "silicone" is well understood to those of skill in the relevant art and refers to polyorganosiloxanes having a backbone formed from silicon and oxygen atoms and sidechains containing carbon and hydrogen atoms. For the purposes of this application, the term "silicone" should also be understood to exclude siloxanes that contain fluorine atoms, while the term "fluorosilicone" is used to cover the class of siloxanes that contain fluorine atoms. Other atoms may be present in the silicone rubber, for example, nitrogen atoms in amine groups which are used to link siloxane chains together during crosslinking.

The term "fluorosilicone" as used herein refers to polyorganosiloxanes having a backbone formed from silicon and oxygen atoms, and sidechains containing carbon, hydrogen, and fluorine atoms. At least one fluorine atom is present in the sidechain. The sidechains can be linear, branched, cyclic, or aromatic. The fluorosilicone may also contain functional groups, such as amino groups, which permit addition crosslinking. When the crosslinking is complete, such groups become part of the backbone of the overall fluorosilicone. The side chains of the polyorganosiloxane can also be alkyl or aryl. Fluorosilicones are commercially available, for example, CFl-3510 and CF3502 from NuSil or SLM (n-27) from Wacker.

The terms "print media", "print substrate" and "print sheet" generally refers to a usually flexible physical sheet of paper, polymer, Mylar material, plastic, or other suitable physical print media substrate, sheets, webs, etc., for images, whether precut or web fed.

The term "printing device" or "printing system" as used herein refers to a digital copier or printer, scanner, image printing machine, xerographic device, electrostatographic device, digital production press, document processing system, image reproduction machine, bookmaking machine, facsimile machine, multi-function machine, or generally an apparatus useful in performing a print process or the like and can include several marking engines, feed mechanism, scanning assembly as well as other print media processing units, such as paper feeders, finishers, and the like. A "printing system" may handle sheets, webs, substrates, and the like. A printing system can place marks on any surface, and the like, and is any machine that reads marks on input sheets; or any combination of such machines.

As used herein, an "electromagnetic receptor" or "electromagnetic absorbent" is a material which will interact with electromagnetic energy to dissipate the energy such as heat. The applied electromagnetic energy could be used to trigger thermal losses at the receptor through a combination of loss mechanisms.

All physical properties that are defined hereinafter are measured at 20° to 25° C. unless otherwise specified. The term "room temperature" refers to 25° C. unless otherwise specified.

When referring to any numerical range of values herein, such ranges, are understood to include each and every number and/or fraction between the stated range minimum and maximum. For example, a range of 0.5-6% would expressly include all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

While the fluorosilicone composition is discussed herein in relation to ink-based digital offset printing or variable data lithographic printing systems, embodiments of the fluorosilicone composition, or methods of manufacturing imaging members using the same, may be used for other applications, including printing applications other than ink based digital offset printing or variable data lithographic printing systems.

Many of the examples mentioned herein are directed to an imaging blanket (including, for example, a printing sleeve, belt, drum, and the like) that has a uniformly grained and textured blanket surface that is ink-patterned for printing. In a still further example of variable data lithographic printing, such as disclosed in the '212 Publication, a direct central impression printing drum having a low durometer polymer imaging blanket is employed, over which, for example, a latent image may be formed and inked. Such a polymer imaging blanket requires, among other parameters, a unique specification of surface roughness, radiation absorptivity, and oleophobicity.

FIG. 1 depicts a related art variable data lithography printing system 10 as disclosed in the '212 Publication. A general description of the exemplary system 10 shown in FIG. 1 is provided here. Additional details regarding individual components and/or subsystems shown in the exemplary system 10 of FIG. 1 may be found in the '212 Publication. As shown in FIG. 1, the exemplary system 10 may include an imaging member 12 used to apply an inked image to a target image receiving media substrate 16 at a transfer nip 14. The transfer nip 14 is produced by an impression roller 18, as part of an image transfer mechanism 30, exerting pressure in the direction of the imaging member 12.

The exemplary system 10 may be used for producing images on a wide variety of image receiving media substrates 16. The '212 Publication explains the wide latitude of marking (printing) materials that may be used, including marking materials with pigment densities greater than 10% by weight. Increasing densities of the pigment materials suspended in solution to produce different color inks is generally understood to result in increased image quality and vibrancy. These increased densities, however, often result in precluding the use of such inks in certain image forming applications that are conventionally used to facilitate variable data digital image forming, including, for example, jetted ink image forming applications.

As noted above, the imaging member 12 may be comprised of a reimageable surface layer or plate formed over a structural mounting layer that may be, for example, a cylindrical core, or one or more structural layers over a cylindrical core. A fountain solution subsystem 20 may be provided generally comprising a series of rollers, which may be considered as dampening rollers or a dampening unit, for uniformly wetting the reimageable plate surface with a layer of dampening fluid or fountain solution, generally having a uniform thickness, to the reimageable plate surface of the imaging. The fountain solution may be applied by vapor deposition to create a thin layer of the fountain solution for uniform wetting and pinning. The method is disclosed in Xerox U.S. Pat. No. 9,327,487 by Liu and U.S. Pat. No. 9,267,646 by Knausdorf et al., the disclosure of both hereby incorporated by reference herein in its entirety.

Once the dampening fluid or fountain solution is metered onto the reimageable surface, a thickness of the layer of dampening fluid or fountain solution may be measured using a sensor 22 that provides feedback to control the metering of the dampening fluid or fountain solution onto the reimageable plate surface. An optical patterning subsystem 24 may be used to selectively form a latent image in the uniform fountain solution layer by image-wise patterning the fountain solution layer using, for example, laser energy. It is advantageous to form the reimageable plate surface of the imaging member 12 from materials that should ideally absorb most of the IR or laser energy emitted from the optical patterning subsystem 24 close to the reimageable plate surface. Forming the plate surface of such materials may advantageously aid in substantially minimizing energy wasted in heating the fountain solution and coincidentally minimizing lateral spreading of heat in order to maintain a high spatial resolution capability. The mechanics at work in the patterning process undertaken by the optical patterning subsystem 24 of the exemplary system 10 are described in detail with reference to FIG. 5 in the '212 Publication. Briefly, the application of optical patterning energy from the optical patterning subsystem 24 results in selective evaporation of portions of the uniform layer of fountain solution in a manner that produces a latent image.

The patterned layer of fountain solution having a latent image over the reimageable plate surface of the imaging member 12 is then presented or introduced to an inker subsystem 26. The inker subsystem 26 is usable to apply a uniform layer of ink over the patterned layer of fountain solution and the reimageable plate surface of the imaging member 12. In embodiments, the inker subsystem 26 may use an anilox roller to meter an ink onto one or more ink forming rollers that are in contact with the reimageable plate surface of the imaging member 12. In other embodiments, the inker subsystem 26 may include other traditional elements such as a series of metering rollers to provide a precise feed rate of ink to the reimageable plate surface. The inker subsystem 26 may deposit the ink to the areas representing the imaged portions of the reimageable plate surface, while ink deposited on the non-imaged portions of the fountain solution layer will not adhere to those portions.

Cohesiveness and viscosity of the ink residing on the reimageable plate surface may be modified by a number of mechanisms, including through the use of some manner of rheology control subsystem 28. In embodiments, the rheology control subsystem 28 may form a partial crosslinking core of the ink on the reimageable plate surface to, for example, increase ink cohesive strength relative to an adhesive strength of the ink to the reimageable plate surface. In embodiments, certain curing mechanisms may be employed. These curing mechanisms may include, for example, optical or photo curing, heat curing, drying, or various forms of chemical curing. Cooling may be used to modify rheology of the transferred ink as well via multiple physical, mechanical or chemical cooling mechanisms.

Substrate marking occurs as the ink is transferred from the reimageable plate surface to a substrate of image receiving media 16 using the transfer subsystem 30. With the adhesion and/or cohesion of the ink having been modified by the rheology control system 28, modified adhesion and/or cohesion of the ink causes the ink to transfer substantially completely preferentially adhering to the substrate 16 as it separates from the reimageable plate surface of the imaging member 12 at the transfer nip 14. Careful control of the temperature and pressure conditions at the transfer nip 14, combined with reality adjustment of the ink, may allow transfer efficiencies for the ink from the reimageable plate surface of the imaging member 12 to the substrate 16 to exceed 95%. While it is possible that some fountain solution may also wet substrate 16, the volume of such transferred fountain solution will generally be minimal so as to rapidly evaporate or otherwise be absorbed by the substrate 16.

Finally, a cleaning system 32 is provided to remove residual products, including non-transferred residual ink and/or remaining fountain solution from the reimageable plate surface in a manner that is intended to prepare and condition the reimageable plate surface of the imaging member 12 to repeat the above cycle for image transfer in a variable digital data image forming operations in the exemplary system 10. An air knife may be employed to remove residual fountain solution. It is anticipated, however, that some amount of ink residue may remain. Removal of such remaining ink residue may be accomplished through use by some form of cleaning subsystem 32. The '212 Publication describes details of such a cleaning subsystem 32 including at least a first cleaning member such as a sticky or tacky member in physical contact with the reimageable surface of the imaging member 12, the sticky or tacky member removing residual ink and any remaining small amounts of surfactant compounds from the fountain solution of the reimageable surface of the imaging member 12. The sticky or tacky member may then be brought into contact with a smooth roller to which residual ink may be transferred from the sticky or tacky member, the ink being subsequently stripped from the smooth roller by, for example, a doctor blade.

The '212 Publication details other mechanisms by which cleaning of the reimageable surface of the imaging member 12 may be facilitated. Regardless of the cleaning mechanism, however, cleaning of the residual ink and fountain solution from the reimageable surface of the imaging member 12 is essential to prevent a residual image from being printed in the proposed system. Once cleaned, the reimageable surface of the imaging member 12 is again presented to the fountain solution subsystem 20 by which a fresh layer of fountain solution is supplied to the reimageable surface of the imaging member 12, and the process is repeated.

The imaging member 12 plays multiple roles in the variable data lithography printing process, which include: (a) deposition of the fountain solution, (b) creation of the latent image, (c) printing of the ink, and (d) transfer of the ink to the receiving substrate or media. Some desirable qualities for the imaging member 12, particularly its surface, include high tensile strength to increase the useful service lifetime of the imaging member. In some embodiments, the surface layer should also weakly adhere to the ink, yet be wettable with the ink, to promote both uniform inking of image areas and to promote subsequent transfer of the ink from the surface to the receiving substrate. Finally, some solvents have such a low molecular weight that they inevitably cause some swelling of imaging member surface layers. Wear can proceed indirectly under these swell conditions by causing the release of near infrared laser energy absorbing particles at the imaging member surface, which then act as abrasive particles. Accordingly, in some embodiments, the imaging member surface layer has a low tendency to be penetrated by solvent.

In some embodiments, the surface layer may have a thickness of about 10 microns (μm) to about 1 millimeter (mm), depending on the requirements of the overall printing system. In other embodiments, the surface layer has a thickness of about 20 μm to about 100 In one embodiment, the thickness of the surface layer is of about 40 μm to about 60 μm.

In some embodiments, the surface layer may have a surface energy of 22 dynes/cm or less with a polar component of 5 dynes/cm or less. In other embodiments, the surface layer has a surface tension of 21 dynes/cm or less with a polar component of 2 dynes/cm or less or a surface tension of 19 dynes/cm or less with a polar component of 1 dyne/cm or less.

Figure 2:
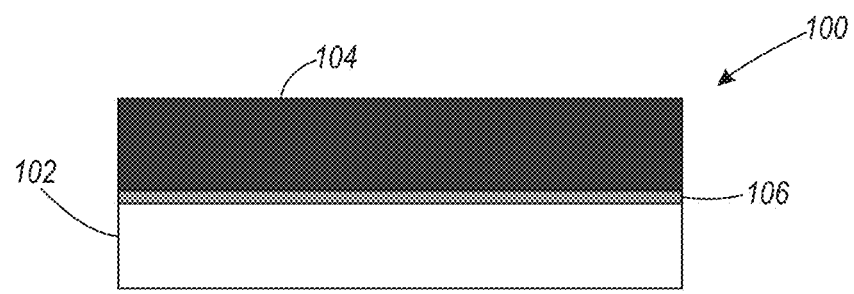
FIG. 2 is a side diagrammatical view of an imaging blanket in accordance with an exemplary embodiment.

FIG. 2 depicts an imaging blanket 100 for a variable data lithography printing system. The imaging blanket 100 is shown having a base 102, a surface layer 104 and a primer layer 106 therebetween. The base 102 is a carcass at the interior of the imaging blanket intentionally designed to support the surface (e.g., topcoat) layer. The carcass may be Sulphur free, even though the surface layer is not limited to a specific carcass. Further, the carcass may be made of polyester, polyethylene, polyamide, fiberglass, polypropylene, vinyl, polyphenylene, sulphide, aramids, cotton fiber or any combination thereof. The surface layer 104 includes a fluorosilicone composition coated about the base. The fluorosilicone surface layer may be platinum catalyzed including carbon black, a silica, a crosslinker, and a solvent.

While not being limited to a particular feature, the primer layer 106 may be applied between the base 102 and the surface layer 104 to improve adhesion between the base and surface layer. An example of the primer in the primer layer is a siloxane based primer with the main component being octamethyl trisiloxane (e.g., S11 NC commercially available from Henkel). In addition, an inline corona treatment can be applied to the base 102 and/or primer layer 106 for further improved adhesion, as readily understood by a skilled artisan. Such inline corona treatments may increase the surface energy and adhesion of the imaging blanket layers.

Some embodiments contemplate methods of manufacturing the imaging member surface layer 104. For example, in one embodiment, the method includes depositing a fluorosilicone surface layer composition upon a multilayer base by flow coating, ribbon coating or dip coating; and curing the surface layer at an elevated temperature. In other examples, the fluoroelastomer surface layer may further comprise a catalyst, such as a platinum catalyst, and a crosslinker. In one embodiment, the fluoroelastomer surface layer is flow coated unto the base and primer layers through one or more nozzles, platinum catalyzed and post-cured at an elevated temperature, for example, of 160° C. For example, the fluoroelastomer surface layer composition may be deposited on the base and primer layers at a spindle speed between 5 and 300 RPM, with a coating head traverse rate between 2 to 60 mm/min, a coat dispensing rate from 6 to 40 grams/min, and at a relative humidity at 25° C. between 40 to 65%.

The curing may be performed at an elevated temperature of from about 110° C. to about 160° C. This elevated temperature is in contrast to room temperature. The curing may occur for a time period of from about 2 to 6 hours. In some embodiments, the curing time period is between 3 to 5 hours. In one embodiment, the curing time period is about 4 hours.

As described above, the surface layer 104 may include a fluoroelastomer composition. In the examples, the formulation for the fluoroelastomer composition may include a fluorosilicone elastomer, an infrared-absorbing filler, a crosslinker, a catalyst and an alkyl-acetate solvent. The formulation uses an environmentally friendly organic solvent (e.g., butyl acetate), thus, eliminating concerns with TFT.

In the examples, the infrared-absorbing filler may be carbon black, a metal oxide such as iron oxide (FeO), carbon nanotubes, graphene, graphite, or carbon fibers. The filler may have an average particle size of from about 2 nanometers (nm) to about 10 μm. In one example, the filler may have an average particle size of from about 20 nm to about 5 μm. In another embodiment, the filler has an average particle size of about 100 nm. Preferably, the infrared-absorbing filler is carbon black. In another example, the infrared-absorbing filler is a low-sulphur carbon black, such as Emperor 1600 (available from Cabot). The inventors found that the sulphur content needs to be controlled for a proper cure of the fluorosilicone. In an example, a sulphur content of the carbon black is 0.3% or less. In another example, the sulphur content of the carbon black is 0.15% or less.

The fluoroelastomer composition may include between 5% and 30% by weight infrared-absorbing filler based on the total weight of the fluoroelastomer composition. In an example, the fluoroelastomer includes between 15% and 35% by weight infrared-absorbing filler. In yet another example, the fluoroelastomer includes about 20% by weight infrared-absorbing filler based on the total weight of the fluoroelastomer composition.

The catalyst in the fluoroelastomer composition may be a platinum (Pt) catalyst, for example, a 14.3% Platinum in butyl acetate. In one example, the fluoroelastomer composition includes between 0.15% and 0.35% by weight of a catalyst based on the total weight of the fluoroelastomer composition. In another embodiment, the fluoroelastomer includes between 0.2% and 0.30% by weight catalyst. In yet another example, the fluoroelastomer includes about 0.25% by weight catalyst based on the total weight of the fluoroelastomer composition.

The crosslinker in the fluoroelastomer composition may be a vinyl terminated trifluoropropyl methylsiloxane. In some embodiments, the vinyl terminated trifluoropropyl methylsiloxane crosslinker is a SLM 50336 crosslinker from Wacker. In the examples, the fluoroelastomer composition includes between 10% and 28% by weight of the crosslinker based on the total weight of the fluoroelastomer composition. In examples, the fluoroelastomer includes between 12% and 20% by weight crosslinker. In yet other examples, the fluoroelastomer includes about 15% by weight crosslinker based on the total weight of the fluoroelastomer composition.

In exemplary embodiments, the fluoroelastomer composition includes silica. For example, in one embodiment, the fluoroelastomer composition includes between 1% and 5% by weight silica based on the total weight of the fluoroelastomer composition. In another embodiment, the fluoroelastomer includes between 1% and 4% by weight silica. In yet another embodiment, the fluoroelastomer includes about 1.15% by weight silica based on the total weight of the fluoroelastomer composition. The silica may have an average particle size of from about 10 nm to about 0.2 μm. In one embodiment, the silica may have an average particle size of from about 50 nm to about 0.1 μm. In another embodiment, the silica has an average particle size of about 20 nm.

In examples of the embodiments, the fluorosilicone surface layer has a first part and a second part. While not being limited to a particular theory, the first part (Part A) may include SLM (e.g., about 10-30% Part A), carbon black (e.g. about 1-10% Part A), silica (e.g., about 0.1-5% Part A), a dispersant (e.g., about 0.1-1% Part A), and butyl acetate (e.g., about 50-80% Part A), and the second part (Part B) may include a platinum catalyst (e.g., about 1-8% Part B), a Wacker crosslinker (e.g., about 30-60% Part B), butyl acetate (e.g., about 30-60% Part B) and an inhibitor (e.g., about 0.1-1% Part B). In another example, the first part may include a vinyl terminated trifluoropropyl methylsiloxane polymer (e.g., Wacker 50330, SML (n=27)), carbon black (e.g., low-sulphur carbon black), silica and butyl acetate, and the second part may include a platinum catalyst, a crosslinker (e.g., methyl hydro siloxane trifluoropropyl methylsiloxane (Wacker SLM 50336)), a dispersion stabilizer (e.g., polyoxyalkylene amine derivative), and an inhibitor (e.g., Wacker Pt 88). In another example, the fluorosilicone surface layer may have viscosity adjusted to about 90-110 cP, with the first part (Part A) including 55-65 grams (g) of a vinyl terminated trifluoropropyl methylsiloxane polymer (e.g., about 21-25% Part A, SML (n=27)), 16-20 g of carbon black (e.g., about 6.2-7.8% Part A, low-sulphur carbon black), 0.95-1.15 g (e.g., about 0.37-0.45% Part A) of the silica and 160-200 g (e.g., about 67-72% Part A) of butyl acetate, and the second part (Part B) may include 2.5-3.5 ml of the platinum catalyst (e.g., about 4.3-5.9% Part B, about 14.3% in Butyl Acetate), about 26-29 g of a crosslinker (e.g., about 44-49% Part B, methyl hydro siloxane trifluoropropyl methylsiloxane), about 26-29 g of butyl acetate (e.g., about 44-49% Part B), and 400-500 μl (e.g., about 0.65-0.83% Part B) of an inhibitor. The first part may also include a dispersant (e.g., a polyoxyalkylene amine derivative commercially available from CRODA), for example, about 0.7-1.1 g (about 0.25-0.4% Part A) of dispersant when combined with the aforementioned quantity of ingredients of the first part. In examples the second part may also include a polyoxyalkylene amine derivative as a dispersion stabilizer.

Aspects of the present disclosure may be further understood by referring to the following examples. The examples are illustrative, and are not intended to be limiting embodiments thereof. Each of the examples illustrates a process of making a fluoroelastomer according to an exemplary embodiment of the present disclosure.

Example 1

An exemplary formulation of the fluorosilicone composite is as follows:

Part A:

| Components | Weight (g) | % Part A |
|---|---|---|
| SLM | 60 | 23.16 |
| Carbon Black | 18 | 6.95 |
| Silica | 1.05 | 0.41 |
| Butyl Acetate | 180 | 69.48 |
| Beads | 105 | (not included) |

Part B:

| Components | Weight (g) | % Part B |
|---|---|---|
| Pt catalyst | 3 | 5.15 |
| Wacker Crosslinker | 27.42 | 47.04 |
| Butyl Acetate | 27.42 | 47.04 |
| Pt 88(inhibitor) | 0.45 | 0.77 |

Viscosity: adjusted to 100 cP.

In Example 1, Part A of the formulation was prepared with two-step shaking. First, the Silica was placed in the vacuum oven being vacuumed at 100° C. for two hours whereas carbon black was used directly without any treatment. Then, 1.05 g of silica and 18 g of carbon black were mixed with 180 g of butyl acetate and 105 g of stainless steel beads in a polypropylene bottle followed by shaking in a paint-shaker for three hours. After the shaking was done, 60 g of SLM was added into the dispersion followed by the other four hour shaking.

SML (n=27) fluorosilicone is illustrated in Formula 1 below.

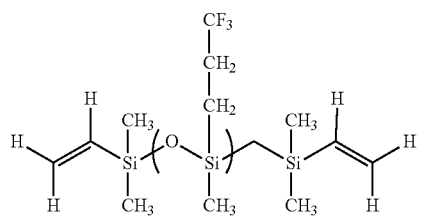

Formula 1

As noted above, Part B of the formulation of the fluorosilicone surface layer includes a platinum catalyst (14.3% in butyl acetate) and crosslinker solution. The crosslinker solution was prepared by addition of 27.42 g of vinyl terminated trifluoropropyl methylsiloxane polymer Wacker crosslinker, 27.42 g of butyl acetate and 450 µl of the catalyst inhibitor Pt 88 altogether in a polypropylene bottle. The solution underwent an ultrasonic bath for 30 minutes. Platinum (14.3% in butyl acetate) was prepared by addition of 429 µl of platinum catalyst into the polypropylene bottle with 2571 µl of butyl acetate. It should be noted that the catalyst inhibitor Pt88 may be used in the solution to increase the pot life of the solution for flow coating. The inventors found that addition of Pt88 does not affect the curing process but only increases the pot life.

The Platinum (Pt) catalyst is illustrated in Formula 2 below.

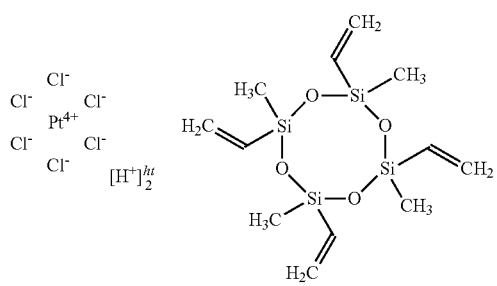

Formula 2

The Wacker crosslinker is illustrated in Formula 3 below.

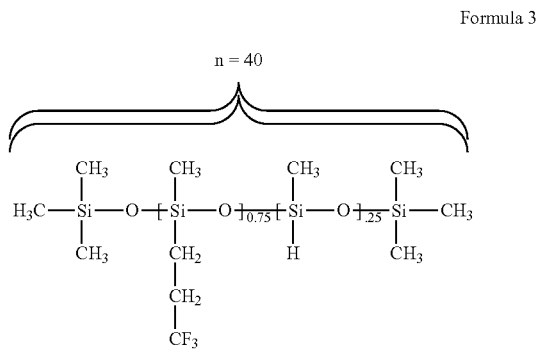

Formula 3

The crosslinking is illustrated in Formula 4 below.

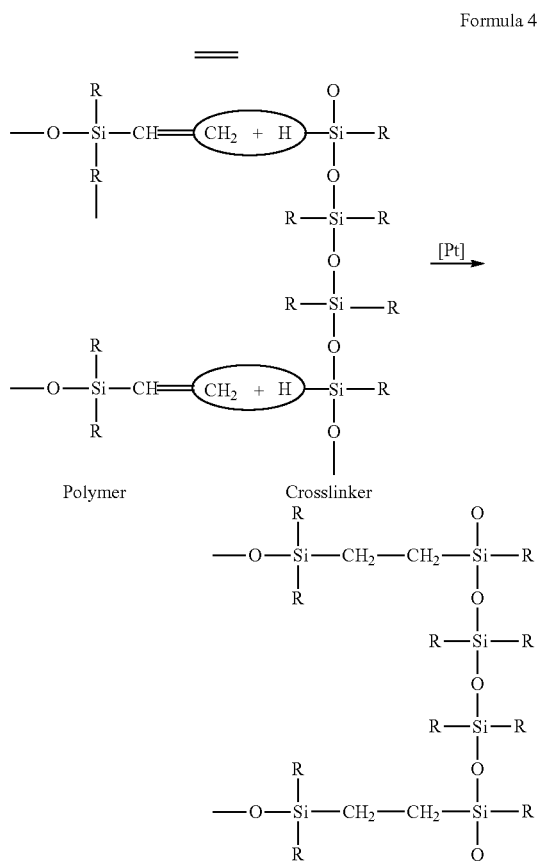

Formula 4

Mechanism of Crosslinking

R=—CH3 or —CH2-CH2-CF3

When the shaking process for Part A was completed, the platinum 14.3% was added in the solution of Part A followed by 5 min of gentle shaking. Then the crosslinker was added in the modified Part A solution followed by 5 min of ball milling. The total solid content was controlled by dilution with additional amount of butyl acetate. The dispersion was filtered to remove the stainless steel beads, followed by degassing of the filtered dispersion. The dispersion was then coated over the multilayer base and primer layer. The dispersion could also be molded. The coated platinum catalyzed fluorosilicone surface layer was heated at 160° C. for 4 hour to finish curing of the multilayer imaging blanket.

It should be noted that the fluorosilicone formulation process discussed in Example 1 requires vigorous shaking, for example, with a paint shaker, for numerous hours (~7 hours) to disperse the carbon black in the formulation. The inventors have further discovered a fluorosilicone formulation process that avoids the vigorous shaking by using a more manufacture friendly roll ball milling process. The process may add a dispersant intentionally designed to help in stabilizing the formulation.

Example 2

An exemplary formulation of the fluorosilicone composite is as follows:
Part A:

| Components | Weight (g) | % Part A |
|---|---|---|
| SLM | 60 | 23.08 |
| Carbon Black | 18 | 6.92 |
| Silica | 1.05 | 0.40 |
| Dispersant | 0.9 | 0.35 |
| Butyl Acetate | 180 | 69.24 |
| Beads | 105 | (not included) |

Part B:

| Components | Weight (g) | % Part B |
|---|---|---|
| Pt Catalyst | 3 | 5.15 |
| Wacker Crosslinker | 27.42 | 47.04 |
| Butyl Acetate | 27.42 | 47.04 |
| Pt 88 (inhibitor) | 0.45 | 0.77 |

Viscosity: adjusted to 100 cP

In Example 2, Part A of the formulation was prepared with a two-step rolling process in contrast to the shaking procedure in Example 1. First, Silica was placed in a vacuum oven and vacuumed at 100° C. for 2 hours whereas carbon black and the dispersant were used directly without any treatment. Then, 1.05 g of silica, 18 g of carbon black and 0.9 g of dispersant were mixed with 180 g of butyl acetate and 105 g of stainless steel beads in a container (e.g., polypropylene bottle). The combination was placed in a ball mill roller for overnight (e.g., 12-16 hours) mixing. The following day, 60 g of fluorosilicone was added into the dispersion followed by ball mill rolling for 4 hours to mix the composite and disperse the carbon black in the dispersion.

Part B of the fluorosilicone composite of Example 2 includes two chemicals: Pt catalyst (14.3% in butyl acetate) and a crosslinker solution. The crosslinker solution was prepared by combining 27.42 g of the Wacker crosslinker, 27.42 g of butyl acetate and 450 µl of the catalyst inhibitor Pt 88 in a polypropylene bottle. The Pt catalyst (14.3% in butyl acetate) was prepared by combining 429 µl of the Pt catalyst in a polypropylene bottle with 2571 µl of butyl acetate. As noted above, the catalyst inhibitor Pt 88 is used in the exemplary formulation to increase the pot life of the solution for flow coating and does not affect the curing process.

The fluorosilicone, platinum catalyst, crosslinker, and crosslinking mechanism are illustrated in Formulas 1-4, respectively, above. The dispersant is illustrated in Formula 5 below:

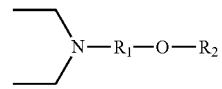

Formula 5

When the rolling process for Part A was done, Pt catalyst (e.g., 14.3% in Butyl Acetate) was added in the Part A combination and mixed via 15 min of ball-mill. Then the crosslinker solution was added in the Part A mixture followed by 5 min of ball milling. The total solid content was controlled by dilution with the additional amount of butyl acetate in the crosslinker solution. The dispersion was filtered to remove stainless steel beads, and then degassed, for example, by a desiccator having a vacuum pump. The dispersion was then ready for either molding or flow coating, for example, as a coated film onto a base of an imaging member. The coated film was heated 160° C. for 4 hour to finish curing.

The extractable of the resulting fluorosilicone film with dispersant was carried out by soaking 0.5 g of cured fluorosilicone in 20 g of butyl acetate and measuring the weight loss. The extractable was found to be less than 5% and close to the extractable of fluorosilicone film without dispersant indicating no disruption in curing level with dispersant.

Example 3

An exemplary formulation of the fluorosilicone composite is as follows:
Part A:
  SLM (n=27) fluorosilicone—60 g
  Carbon Black (20%)—18 g
  Silica (1.15%)—1.05 g
  Dispersant—0.9 g
  Butyl Acetate—180 g
  Stainless Steel Beads—105 g
Part B:
  Platinum (Pt) catalyst (14.3% in Butyl Acetate)—3000 µl
  Wacker crosslinker—27.42 g
  Butyl Acetate—27.42 g
  Pt 88 catalyst inhibitor—450 µl
  Viscosity: Adjusted to 100 cP In Example 3, Parts A and B of the fluorosilicone composite is the same as in Example 2. However, the composite was formed by the shaking procedure of Example 1, instead of the rolling process discussed in Example 2. In other words, Part A of the formulation was prepared with two-step shaking. First, the Silica was placed in the vacuum oven being vacuumed at 100° C. for two hours whereas carbon black was used directly without any treatment. The two hour heated vacuum removes the moisture from silica which helps in preventing the formation of bubbles during coating. Then, 1.05 g of silica, 18 g of carbon black and 0.9 g of dispersant were mixed with 180 g of butyl acetate and 105 g of stainless steel beads in a polypropylene bottle followed by shaking in a paint-shaker for three hours. After the shaking was done, 60 g of SLM was added into the dispersion followed by the other four hour shaking. Part B of the fluorosilicone composite of Example 3 was prepared and mixed with Part A as discussed above in Example 1. The fluorosilicone, platinum catalyst, crosslinker, crosslinking mechanism, and dispersant are illustrated in Formulas 1-5, respectively, above.

Figure 3:
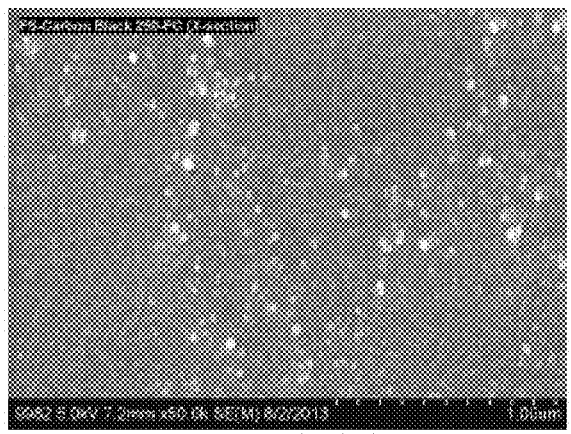
FIG. 3 illustrates a Scanning Electron Micrograph (SEM) cross-section image showing carbon black dispersion in a related art fluorosilicone composite.
Figure 4:
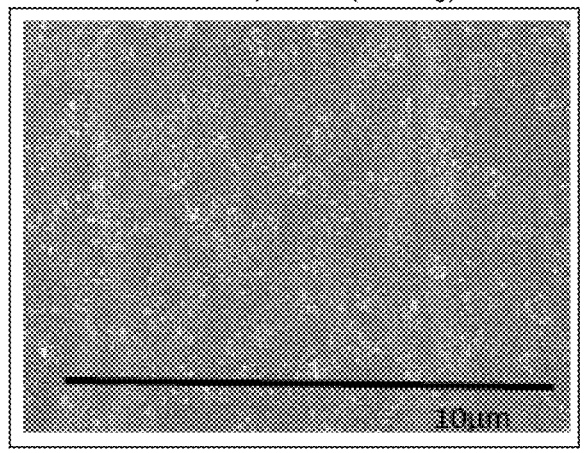
FIG. 4 illustrates a SEM cross-section image showing carbon black dispersion in an exemplary fluorosilicone composite.
Figure 5:
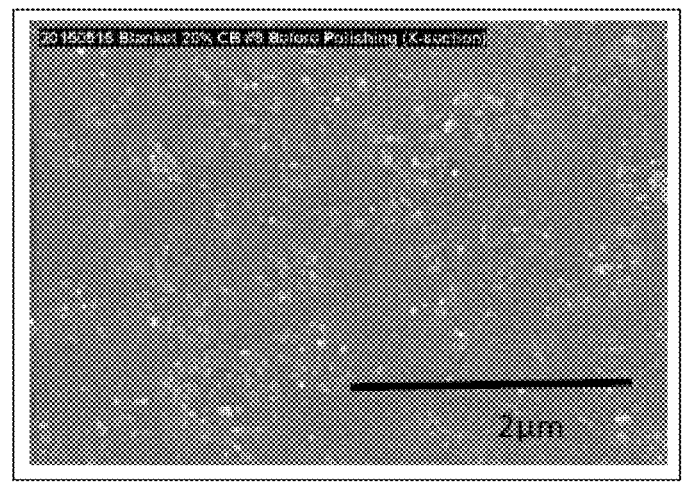
FIG. 5 is an enlarged view of a portion of the SEM cross-section image illustrated in FIG. 4.
Figure 6:
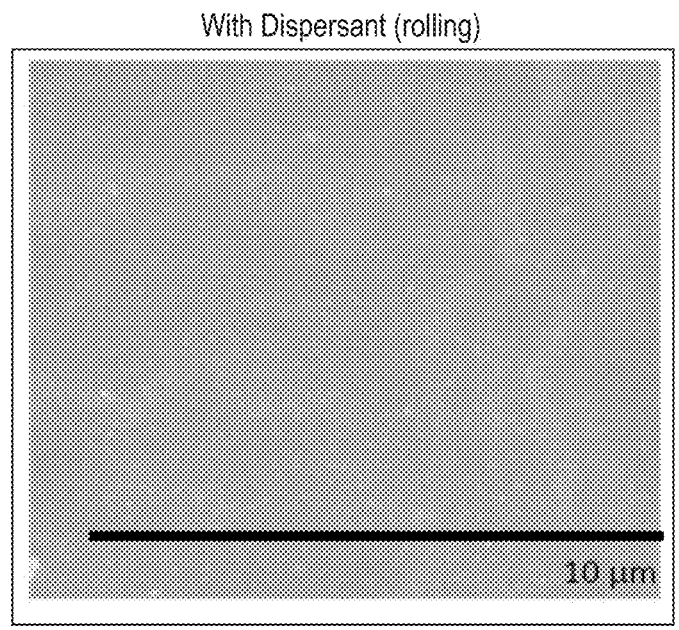
FIG. 6 illustrates an SEM cross-section image showing carbon black dispersion in another exemplary fluorosilicone composite.
Figure 7:
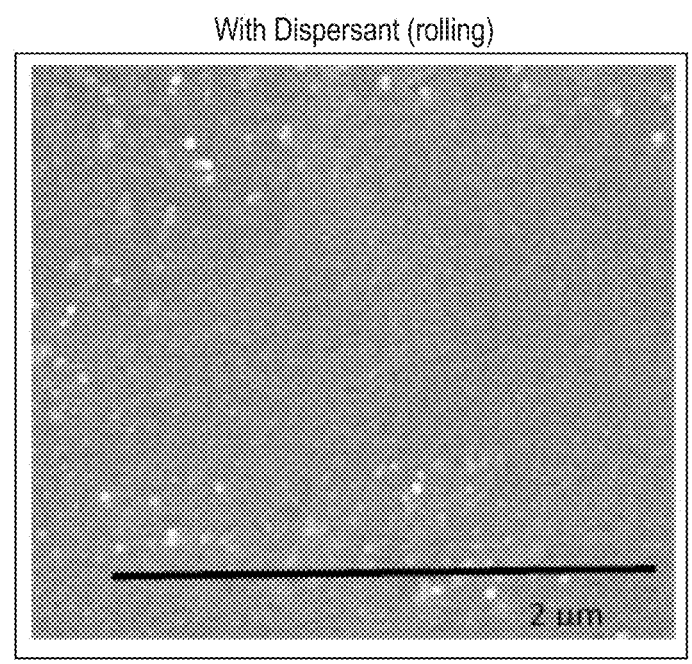
FIG. 7 is an enlarged view of a portion of the SEM cross-section image illustrated in FIG. 6.
Figure 8:
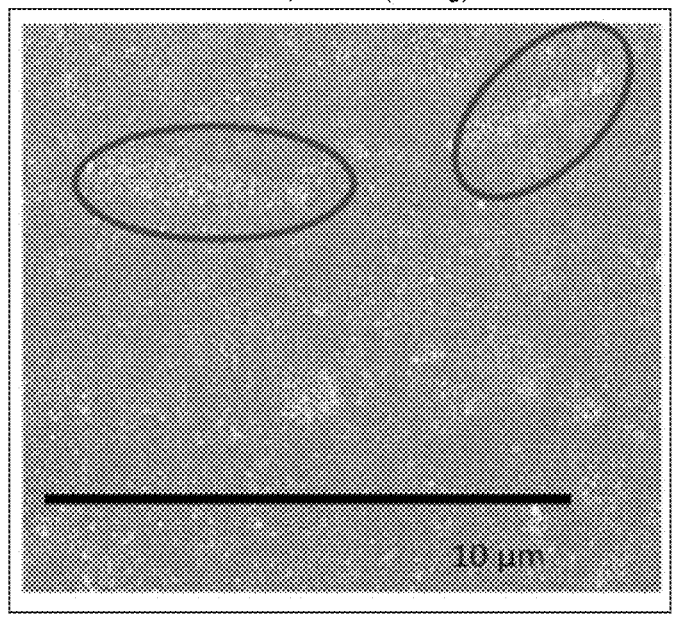
FIG. 8 illustrates a SEM cross-section image showing carbon black dispersion in yet another exemplary fluorosilicone composite.
Figure 9:
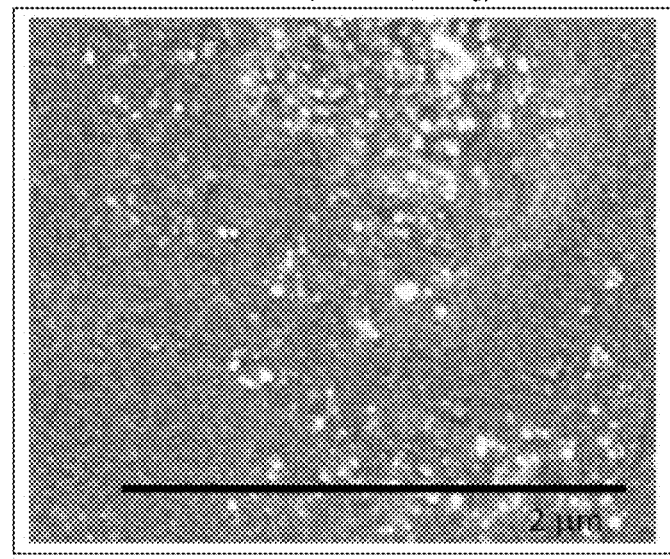
FIG. 9 is an enlarged view of a portion of the SEM cross-section image illustrated in FIG. 8.

Control experiments were provided for different fluorosilicone composite films. Scanning Electron Micrograph (SEM) cross-section images of the fluorosilicone films with and without dispersant were carried out, with FIGS. 3-9 illustrating carbon black dispersion in the different composites. For samples without dispersant, both the rolling and paint shaking methods were used. In particular, FIG. 3 illustrates a Scanning Electron Micrograph (SEM) cross-section image showing carbon black dispersion in a related art fluorosilicone composite included Trifluorotoluene (TFT) as a solvent with a paint shaking process. FIG. 4 illustrates a SEM cross-section image showing carbon black dispersion in an exemplary fluorosilicone composite described in Example 1 with the paint shaking process discussed under Example 1. FIG. 5 depicts an enlarged view of a portion of the SEM cross-section image illustrated in FIG. 4. FIG. 6 illustrates an SEM cross-section image showing carbon black dispersion in an exemplary fluorosilicone composite described in Example 2 with the rolling process discussed in Example 2. FIG. 7 depicts an enlarged view of a portion of the SEM cross-section image illustrated in FIG. 6. FIG. 8 illustrates a SEM cross-section image showing carbon black dispersion in an exemplary fluorosilicone composite described in Example 1 with the rolling process discussed in Example 2. FIG. 9 depicts an enlarged view of a portion of the SEM cross-section image illustrated in FIG. 8.

As can be seen in FIGS. 3-5, the dispersion quality of carbon black in the butyl acetate solution is comparable with carbon black dispersion of the related art TFT formulation. This shows that the formulation with butyl acetate is capable of replacing the TFT process for blanket manufacturing. Regarding FIGS. 6 and 7, the fluorosilicone composite with the dispersant prepared by the rolling method resulted in an even more uniform dispersion of carbon black and highest flow coating characteristics. In addition, the formulation was more stable with dispersant, thus, making the formulation production intent and manufacture friendly. The illustrations of FIGS. 8 and 9 show big agglomerates (e.g., 3-5 microns) of carbon black in the fluorosilicone sample without dispersant prepared by rolling method. These big agglomerates indicate a reduced dispersion quality with reduced flow capabilities that the formulation discussed in Example 2.

The inventors have found that fluoroelastomer composition embodiments according to the disclosure have excellent flow-coatability characteristics. Without being limited to a particular theory, the inventors have surprisingly discovered that the inclusion of dispersant (e.g., including a polyoxyalkylene amine derivative) using a rolling process improves the uniform dispersion of the infrared-absorbing material within the fluorosilicone matrix and improve the flow-coating characteristics of the fluoroelastomer composition. As illustrated in FIGS. 6 and 7, the carbon black is very uniformly distributed in the fluorosilicone matrix with an average particle size of less than 50 nm. The uniform distribution of carbon black also helps in uniform laser absorption and the uniform evaporation of the fountain solution that is essential for the high resolution image formation.

Although the above description may contain specific details, they should not be construed as limiting the claims in any way. Other configurations of the described embodiments of the disclosed systems and methods are part of the scope of this disclosure. For example, the principles of the disclosure may be applied to each individual print station of a plurality of print stations where individual variable data lithography system or groups of the variable data lithography system have associated with them device management applications for communication with a plurality of users or print job ordering sources. Each print station may include some portion of the disclosed variable data lithography system and execute some portion of the disclosed method but not necessarily all of the system components or method steps.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of manufacturing a fluorosilicone composite surface layer for a variable data lithography imaging blanket, comprising:
   A) adding a heated silica, a carbon black, a dispersant, a first portion of butyl acetate and beads together in a container;
   B) mixing the heated silica, the carbon black, the dispersant, the first portion of butyl acetate and the beads resulting in a first mixture;
   C) adding fluorosilicone into the first mixture;
   D) mixing the fluorosilicone and the first mixture resulting in a first part of the fluorosilicone composite;
   E) adding platinum catalyst to the first part of the fluorosilicone composite;
   F) mixing the platinum catalyst and the first part of the fluorosilicone composite resulting in a second mixture;
   G) adding a crosslinker solution to the second mixture and mixing the combination resulting in a third mixture;
   H) diluting the third mixture by combining and mixing a second portion of butyl acetate with the third mixture; and
   I) removing the beads from the third mixture resulting in the fluorosilicone composite.

2. The method of claim 1, further comprising, in Step B), mixing the heated silica, the carbon black, the dispersant, the first portion of butyl acetate and the beads resulting in the first mixture with a ball mill roller for three hours.

3. The method of claim 1, further comprising, in Step B), mixing the heated silica, the carbon black, the dispersant, the first portion of butyl acetate and the beads resulting in the first mixture with a ball mill roller.

4. The method of claim 3, further comprising, in Step D), mixing the fluorosilicone and the first mixture to form the first part of the fluorosilicone composite with the ball mill roller.

5. The method of claim 3, further comprising, in Step D), mixing the fluorosilicone and the first mixture to form the first part of the fluorosilicone composite with the ball mill roller for four hours.

6. The method of claim 1, further comprising, in Step D), mixing the fluorosilicone and the first mixture to form the first part of the fluorosilicone composite with a ball mill roller for four hours.

7. The method of claim 1, further comprising, before Step A), heating the silica in a vacuum oven before adding the heated silica with the carbon black, the dispersant, the first portion of butyl acetate and the beads.

8. The method of claim 1, further comprising, after Step I), degassing the fluorosilicone composite by exposure thereof to the atmosphere.

9. The method of claim 1, wherein Step A) includes adding 0.1-5% of the heated silica, 1-10% of the carbon black, 0.1-1% of the dispersant, and 80-98% of butyl acetate together in the container.

10. The method of claim 1, wherein the beads include stainless steel balls.

11. The method of claim 1, further comprising, after Step I), coating the fluorosilicone composite onto a base of an imaging member, and curing the coated fluorosilicone composite to form the variable data lithography imaging blanket.

12. The method of claim 11, wherein the step of coating the fluorosilicone composite includes coating by flow coating, ribbon coating or dip coating.

13. The method of claim 1, wherein the fluorosilicone includes vinyl terminated trifluoropropyl methylsiloxane.

14. The method of claim 13, wherein the first part of the fluorosilicone composite includes 10-30% of the vinyl terminated trifluoropropyl methylsiloxane, 1-10% of the carbon black, 0.1-1% of the heated silica and 50-80% of the first portion of butyl acetate.

15. The method of claim 14, wherein the first part of the fluorosilicone composite further includes 0.25-0.4% of the dispersant.

16. The method of claim 15, wherein the dispersant includes a polyoxyalkylene amine derivative.

17. The method of claim 1, wherein the crosslinker solution includes methyl hydrosiloxanetrifluoropropyl methylsiloxane.

18. The method of claim 1, wherein the dispersant includes a polyoxyalkylene amine derivative.

19. A method of manufacturing a fluorosilicone composite, comprising:
A) adding a heated silica, a carbon black, a dispersant, a first portion of butyl acetate and beads together in a container;
B) mixing the heated silica, the carbon black, the dispersant, the first portion of butyl acetate and the beads resulting in a first mixture;
C) adding fluorosilicone into the first mixture;
D) mixing the fluorosilicone and the first mixture resulting in a first part of the fluorosilicone composite;
E) adding platinum catalyst to the first part of the fluorosilicone composite;
F) mixing the platinum catalyst and the first part of the fluorosilicone composite resulting in a second mixture;
G) adding a crosslinker solution to the second mixture and mixing the combination resulting in a third mixture;
H) diluting the third mixture by combining and mixing a second portion of butyl acetate with the third mixture; and
I) removing the beads from the third mixture resulting in the fluorosilicone composite.

20. The method of claim 19, wherein Step A) includes adding 0.1-5% of the heated silica, 1-10% of the carbon black, 0.1-1% of the dispersant, and 80-98% of butyl acetate together in the container.

* * * * *